United States Patent
Trundle et al.

(10) Patent No.: US 10,755,443 B1
(45) Date of Patent: Aug. 25, 2020

(54) WATERING VEGETATION BASED ON VIDEO ANALYTICS

(71) Applicant: Alarm.com Incorporated, Tysons, VA (US)

(72) Inventors: Stephen Scott Trundle, Falls Church, VA (US); Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 143 days.

(21) Appl. No.: 15/984,771

(22) Filed: May 21, 2018

Related U.S. Application Data (60) Provisional application No. 62/509,412, filed on May 22, 2017.

(51) Int. Cl.
*G06F 3/00* (2006.01)
*G06T 7/00* (2017.01)
*G06T 7/90* (2017.01)
*A01G 27/00* (2006.01)
*G06T 7/50* (2017.01)
*G06T 7/20* (2017.01)

(52) U.S. Cl.
CPC .............. *G06T 7/90* (2017.01); *A01G 27/003* (2013.01); *G06T 7/20* (2013.01); *G06T 7/50* (2017.01); *G06T 7/97* (2017.01); *G06T 2207/30188* (2013.01); *G06T 2207/30192* (2013.01)

(58) Field of Classification Search
CPC ................ G06K 9/00; A61F 2/00; G06F 3/00
USPC ......................................................... 382/103
See application file for complete search history.

(56) References Cited

U.S. PATENT DOCUMENTS

| | | | | |
|---|---|---|---|---|
| 6,160,902 A | * | 12/2000 | Dickson | G01J 3/2803 348/144 |
| 8,194,916 B2 | * | 6/2012 | Ma | G06K 9/00657 382/100 |

\* cited by examiner

*Primary Examiner* — Abolfazl Tabatabai
(74) *Attorney, Agent, or Firm* — Fish & Richardson P.C.

(57) ABSTRACT

A computer-implemented method includes receiving a reference image of an outdoor area, identifying that a portion of the outdoor area shown in the reference image corresponds to living vegetation, determining, from multiple images of the outdoor area, a reference color that corresponds to a dry condition in the portion of the outdoor area, receiving a sample image of the portion of the outdoor area, determining that a sample color of the portion of the outdoor area shown in the sample image corresponds to the reference color, and based on a determination that the sample color of the portion of the outdoor area shown in the sample image corresponds to the reference color, triggering a watering device to provide water to the portion of the outdoor area.

20 Claims, 5 Drawing Sheets

WATERING VEGETATION BASED ON VIDEO ANALYTICS

CROSS REFERENCE TO RELATED APPLICATIONS

This application claims benefit of U.S. Provisional Application No. 62/509,412, filed on May 22, 2017, and titled "Watering Vegetation Based on Video Analytics," which is incorporated by reference in its entirety.

TECHNICAL FIELD

This disclosure relates to monitoring technology and, for example, monitoring based on video analytics.

BACKGROUND

Properties often include irrigation systems that can provide water to living vegetation in their outdoor areas. Irrigation systems may include sprinklers distributed over the areas and a control panel that a person may use to control operation of the sprinklers.

SUMMARY

Techniques are described for vegetation monitoring technology. For example, techniques are described for watering vegetation based on video analytics.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques are described for watering vegetation based on video analytics. Generally, a color of vegetation may indicate whether a proper amount of water is provided to the vegetation.

For example, vegetation that is watered a proper amount may be green, vegetation that is underwatered may be yellow, and vegetation that is overwatered may be brown. A monitoring system of a property may control how much areas including outdoor living vegetation are watered based on the color of those areas in images or videos captured through an outdoor camera. For example, the monitoring system may provide more water to areas that are known to include vegetation and that are yellow in images, and provide less water to areas that are known to include vegetation and that are brown in images.

Figure 1:
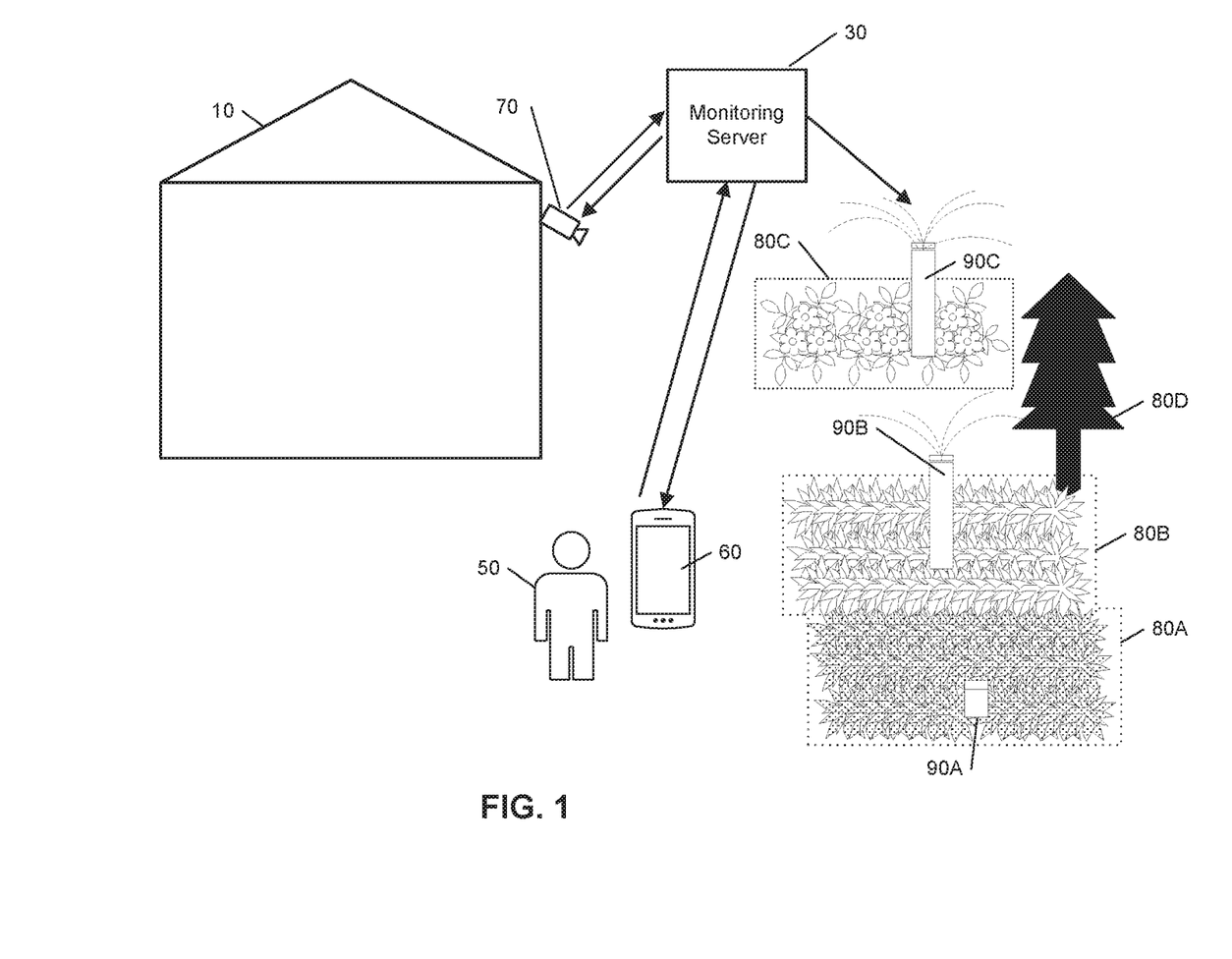
FIG. 1 illustrates a contextual diagram of an example system for watering vegetation based on video analytics.

FIG. 1 illustrates an example of watering vegetation based on video analytics. As shown in FIG. 1, a property 10 (e.g., a house) for a user 50 is monitored by a system (e.g., in-home security system) that includes a monitoring server 30, an outdoor camera 70, and watering devices 90A, 90B, and 90C. The outdoor camera 70 can view outside the property to monitor events (e.g., security breach) and outdoor vegetation areas 80A/80B (lawns) and 80C (flowers) shown as dotted lined area FIG. 1. The example property 10 is equipped with watering devices 90A, 90B, and 90C, e.g., sprinkler heads of a sprinkling system, hose spigots of a drip irrigation system, or some other device that provides water, that can, respectively, provide water to the vegetation areas 80A, 80B, and 80C.

The monitoring server 30 communicates with the outdoor camera 70 to receive images or videos of the vegetation areas 80A, 80B, and 80C taken by the outdoor camera 70. The monitoring server 30 also communicates with the watering devices 90A, 90B, and 90C to control them. In some cases, the property 10 may include a separate watering device controller. For example, the watering device controller may be a control unit in a home that is direct communication with the watering devices 90A-90C through Z-wave, direct communication with the outdoor camera 70 through WiFi, and in communication with the monitoring server 30 through the Internet. In this example, the separate watering device controller may collect images from the outdoor camera 70 and transmit the images to the monitoring server 30 and may pass communications between the watering devices 90A-90C and the monitoring server 30.

In these cases, the monitoring server 30 may communicate with the watering device controller to control the watering devices 90A, 90B, and 90C. The monitoring server 30 also communicates with a mobile phone 60 to receive instructions from the user 50 and to send information to the user 50 regarding the vegetation areas. In some implementations, the monitoring server 30 may be located remote from the property 10 and manage the in-home monitoring system at the property 10, as well as other (and, perhaps, many more) in-home monitoring systems located at different properties that are owned by different users.

In the example shown in FIG. 1, the monitoring server 30 collects and analyzes images of outdoor areas of the property 10 to identify the vegetation areas 80A, 80B, and 80C with living vegetation such as lawns, flowers, and trees. The monitoring server 30 may analyze colors of the outdoor images, change of the colors, a shape of an object in the outdoor areas, or movement of the object to identify the vegetation areas from the images of the outdoor areas. For example, the monitoring server 30 may have a database that includes a reference range of colors, and/or shapes of general vegetation at a particular period of time (e.g., season) and at a geographic location where the property 10 is located. In this case, the monitoring server 30 may compare the outdoor images of the property 10 with the reference range of colors and shapes of vegetation in the database to find matching areas from the outdoor images of the property 10 to identify vegetation areas.

In some cases, the monitoring server 30 may also utilize information regarding movement of living vegetation that can move in a relatively slow speed over a period of time following the sun. Similarly, the monitoring server 30 may analyze multiple images of the outdoor areas over a period of time to detect areas that show a change of color over the period of time and identify the areas as possible vegetation areas. The monitoring server 30 may also analyze the outdoor images with other data available to the monitoring server 30, such as location data of the property 10, weather data at the location, precipitation data, time of day, week of year, and season. In some cases, the monitoring server 30 may request the user 50 via a user interface (e.g., mobile phone 60) to confirm the auto-identified vegetation areas.

In some implementations, the user 50 may indicate vegetation areas in an outdoor image by using a user interface such as a mobile phone 60 or a website. For example, the monitoring server 30 may send an outdoor image to the mobile phone 60 and request to draw a boundary of vegetation area within the outdoor image. In some cases, this process may be repeated over multiple images received from a single outdoor camera or multiple outdoor cameras installed to monitor large vegetation areas or to monitor vegetation areas from multiple perspectives. In some cases, the user 50 may map a predetermined area definition such as sprinkler zones to the vegetation areas to monitor.

The monitoring server 30 collects images including the identified vegetation areas 80A, 80B, and 80C, aggregates color data of the vegetation areas 80A, 80B, and 80C over a period of time at various light conditions, and determines a reference color or baseline color for each vegetation area. The period of time may be relatively long to build a color dataset of each vegetation area over the course of a day, several days, several weeks, several months, and even several years.

By analyzing the aggregated color data, the monitoring server 30 determines an average or expected mean color of each vegetation area 80A, 80B, and 80C at various times and in various light conditions. For example, the monitoring server 30 may determine that a digital color Hex code #006400 (dark green) is expected for the vegetation area 80A and that a digital Hex code #008000 (normal green) is expected for the vegetation area 80B during the first two weeks of April at noon.

Each vegetation area may have different expected or reference colors at a certain time depending on various factors such as amounts of sun light applied to the vegetation areas, soil compositions of the vegetation areas, types of vegetation, dry conditions, traffic nearby, and amounts of water applied to the vegetation areas. For example, the vegetation area 80B may receive less sun light during the day than the vegetation area 80A because a shade of the tree 80D near the vegetation area 80B covers a part of the vegetation area 80B. In this case, the vegetation area 80A may look darker green than the vegetation area 80B. In some cases, the vegetation areas may receive less water than required during the summer, which may turn the vegetation areas to a pale green. Similarly, the vegetation area 80C including flowers may have a different reference color than the vegetation areas 80A and 80B because of the different types of vegetation.

The reference color of each vegetation area may be tightly related to a dry condition of the vegetation area and a user may want to adjust an amount of water provided to the vegetation area according to the dry condition. In the example shown in FIG. 1, the monitoring server 30 may receive a user input to determine a dry condition that corresponds to the identified reference color for the vegetation area 80A, 80B, and 80C. For example, the user 50 may be prompted at images of various points of each vegetation area 80A, 80B, and 80C to indicate a corresponding dry condition such as "overly watered," "properly watered," "slightly dry," and "drought-like." In some implementations, the monitoring server 30 may receive additional user inputs or opinions from multiple other users through a user interface (e.g., a mobile application or a website) in order to accurately determine the state of the vegetation. The users may include a homeowner, a professional gardener, or someone who has knowledge on the type of vegetation of the property. For example, the user might want a Master Gardener to look at their picture and provide a professional opinion of the state of the vegetation, which the system could then use going forward (e.g., the Master Gardener is helping train the algorithm). In some implementations, the monitoring server 30 may have one or more experts weigh in on a sample database of reference pictures to train the monitoring server 30 to perform future recognition for all users. In some implementations, users may be offered the option of sharing images with a 3rd party if the user wants another opinion. In some cases, the user may be sharing with someone they know (e.g., maybe their mother knows a lot about vegetation and they want to solicit her input directly into the system) and in some cases the system may offer to share a picture with someone who has expertise.

In some implementations, the user may also assist in determining a dry condition of the vegetation area 80A, 80B, and 80C based on measurement of soil moisture levels. For instance, the monitoring system may include or communicate with a soil moisture sensor that a user can use to probe a vegetation area. The monitoring system may receive the measurement result from the soil moisture sensor or from the user to determine a dry condition associated with the vegetation area in conjunction with the other information based on the image/video analytics and other user inputs described above. In some implementations, measurements from the soil moisture sensor may also be used to train the system to learn what vegetation looks like when properly watered. This user driven system training may be repeated over a period of time to optimize the monitoring system to the vegetation areas of the property 10. In some implementations, the monitoring server 30 may determine correlation between a dry condition and a reference color based on the other data available to the monitoring server 30. For example, the monitoring server 30 attempts to make this determination automatically using knowledge of region, common vegetation, and index of other nearby property values.

In some cases, the monitoring server 30 may utilize or assume previously known data on vegetation color vs. dry condition to determine a dry condition corresponding to the current color of the vegetation areas. For example, the vegetation area 80A has had a reference color Hex code #006400 (dark green) in May for last several years, which the monitoring server 30 may determine as a reference color of a "properly watered" vegetation area 80A. If the current color of the vegetation area 80A in May is a weaker green (e.g., color Hex code #008000) than the reference color Hex code #006400, the monitoring server 30 determines that the color Hex code #008000 corresponds to a "slightly dry condition" for the vegetation area 80A in May.

The monitoring server 30 may alert the user 50 via the mobile phone 60 when the colors of the vegetation areas 80A, 80B, and 80C are substantially different from the expected reference color for the vegetation areas 80A, 80B, and 80C at a certain time, for example, and when a vegetation area is determined in a drought or under-irrigated condition based on the video analytics described above. If the user 50 confirms the drought condition for the alerted vegetation area, the monitoring server 30 may update the data on vegetation color vs. dry condition to further train the monitoring system with the additional data. In addition, the monitoring server 30 may trigger the watering devices 90A, 90B, and 90C to apply more water to the alerted vegetation area, namely by adjusting frequency and duration of watering.

The monitoring server 30 may also monitor other factors in addition to color of vegetation areas to dynamically adjust an amount of water proved to the vegetation areas. For example, the monitoring server 30 may recognize wilting or drooping leaves from the vegetation area 80C including flowers and the tree 80D by analyzing images and videos of the vegetation areas. Generally, plants wilt in most situations because they have simply run out of available water. Therefore, the monitoring server 30 may trigger the watering devices 90A, 90B, and 90C to apply more water to the vegetation areas showing wilting leaves.

In some cases, the monitoring server 30 may monitor precipitation such as rainfalls in the vegetation areas. When the precipitation is less than previous years, for example, the monitoring server 30 may preemptively trigger the watering devices to dynamically increase an amount of water provided to the vegetation areas. Additionally, the monitoring server 30 may detect maintenance activities in the vegetation areas, for example, mowing lawns and applying a chemical, and adjust the watering schedule accordingly. For instance, the watering schedule may be adjusted to delay by a day for freshly cut lawns. In some cases, the monitoring server 30 may detect the dawn and dusk and control the watering devices 90A, 90B, and 90C to dynamically adjust watering schedule to apply water during dawn and dusk.

Figure 2:
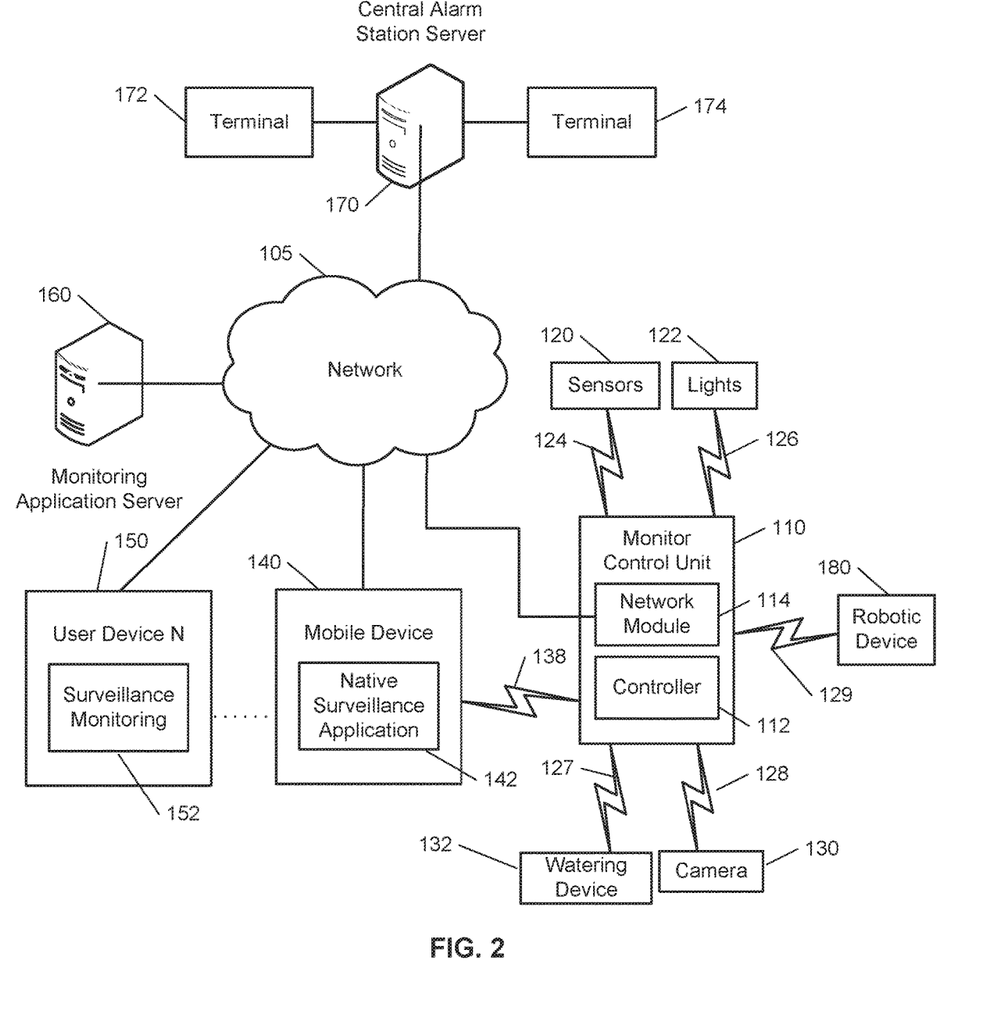
FIG. 2 illustrates an example system.

FIG. 2 illustrates an example of a system 200 configured to provide surveillance, reporting, and vegetation monitoring. The system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105.

For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors

120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring system control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, the watering device 132, and the camera 130 communicate with the controller 112 over communication links 124, 126, 127, 128, and 129. The communication links 124, 126, 127, 128, and 129 may be a wired or wireless data pathway configured to transmit signals from the sensors 120, the module 122, the watering device 132, and the camera 130 to the controller 112. The sensors 120, the module 122, the watering device 132, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more user devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more user devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, the watering device 132, and the camera 130. The one or more user devices 140, 150 receive data directly from the sensors 120, the module 122, the watering device 132, and the camera 130 and sends data directly to the sensors 120, the module 122, the watering device 132, and the camera 130. The one or more user devices 140, 150 provide the appropriate interfaces/processing to provide visual surveillance and reporting.

In other implementations, the system 200 further includes network 105 and the sensors 120, the module 122, the watering device 132, and the camera 130 are configured to communicate sensor and image data to the one or more user devices 140, 150 over network 105 (e.g., the Internet, cellular network, etc.). In yet another implementation, the sensors 120, the module 122, the watering device 132, and the camera 130 (or a component, such as a bridge/router) are intelligent enough to change the communication pathway from a direct local pathway when the one or more user devices 140, 150 are in close physical proximity to the sensors 120, the module 122, the watering device 132, and the camera 130 to a pathway over network 105 when the one or more user devices 140, 150 are farther from the sensors 120, the module 122, the watering device 132, and the camera 130. In some examples, the system leverages GPS information from the one or more user devices 140, 150 to determine whether the one or more user devices 140, 150 are close enough to the sensors 120, the module 122, the watering device 132, and the camera 130 to use the direct local pathway or whether the one or more user devices 140, 150 are far enough from the sensors 120, the module 122, the watering device 132, and the camera 130 that the pathway over network 105 is required. In other examples, the system leverages status communications (e.g., pinging) between the one or more user devices 140, 150 and the sensors 120, the module 122, the watering device 132, and the camera 130 to determine whether communication using the direct local pathway is possible. If communication using the direct local pathway is possible, the one or more user devices 140, 150 communicate with the sensors 120, the module 122, the watering device 132, and the camera 130 using the direct local pathway. If communication using the direct local pathway is not possible, the one or more user devices 140, 150 communicate with the sensors 120, the module 122, the watering device 132, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, one or more of the components of the system 200 (e.g., the monitoring application server 160) may be configured to monitor an outdoor vegetation area and provide water to the vegetation area based on video analytics or image processing. For instance, the system 200 may control a watering device 132 of the property 10 based on determining that the vegetation area shows a color that corresponds to a dry condition based on analyzing images and videos of the vegetation area. The system 200 may control the camera 130 to monitor an outdoor area including living vegetation such as lawns and flowers.

In some implementations, the system 200 may further include one or more robotic devices 180. The robotic devices 180 may be any type of robots that are capable of moving and taking actions. For example, the robotic devices 180 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property).

In some implementations, the robotic devices 180 may assist in monitoring vegetation areas. For instance, a drone may be associated with the monitoring system 200 as one of the robotic devices 180 and may be controlled to take action responsive to monitoring system events. The drone may capture sample images and videos of vegetation areas in a relatively large property based on a predetermined schedule or a user input. In some cases, the drone may also capture close-up images of a specific area in the vegetation area or parts (e.g., leaves, stem, base, etc.) of vegetation. For instance, when the monitoring system would not be able to make a determination of the state of the vegetation or need additional images for a determination, the drone may be dispatched to capture better/clearer/closer images or videos than ones captured by the camera 130. The system 200 may collect these sample images from the drone as well as from the camera to monitor and determine the state of the vegetation.

In some implementations, the robotic devices 180 may include a sensing or probing devices that can measure moisture levels of vegetation areas of a property. For example, the system may deploy a drone to a vegetation area in the property and instruct the drone to measure the moisture level in soil at the vegetation area using a soil moisture sensor equipped with the drone. The drone may replace the soil moisture sensor upon completion of the measurement.

In some implementations, the robotic devices 180 may assist in providing water the vegetation areas. For example, the system 200 may control a drone (e.g., a roller copter) that includes a watering device such as a water storage, a sprayer, a sprinkler head, or a water hose to provide a predetermined amount of water to a specific vegetation area based on the video analytics described above or a user input. For example, a land based drone could have a water storage container and could be dispatched to a specific area of vegetation to water it (e.g., like an autonomous watering can). Water payload may be heavy so these may likely be land based drones rather than flying drones, though either is possible. In another implementation, the drone may not need to carry the water, but it simply moves a hose/sprayer/sprinkler head attached to a water source from point to point as directed by the system.

In some examples, the system 200 may control the watering device of the drone based on a measured amount of water. For instance, the drone may include a flow meter with the watering device to measure an amount of water that flows into the watering device and/or leaves from the watering device. The system 200 may monitor the measured flow rate and instruct the drone to continue or stop watering to the vegetation area. Similarly, drones could also be used to deliver fertilizer treatments to specified plants based on a schedule and/or user input and/or visual analysis by the system.

In some implementations, the robotic devices 180 may be community-based drones that can perform operations monitoring and watering vegetation areas of one or more properties in a neighborhood. For instance, a neighborhood (e.g., a home owner association) may implement the system 200 including community-based drones that can capture images of vegetation areas of each property and/or shared areas in the neighborhood and provide water to the vegetation areas based on the image/video analytics described in this disclosure. The monitoring status of vegetation areas may be reported to the corresponding users or shared with the neighborhood.

In some implementations, all of the processing described throughout this disclosure may be implemented in a monitoring system control panel located inside the property being monitored, as opposed to sending data to an external server for processing. For example, rather than being a separate server located in a remote location, the monitoring application server 160 may be a logical component inside of the monitoring system control unit 110. In this example, the monitoring system control unit 110 performs the processing of watering vegetation based on video analytics without having to send image/video data to a separate server separated by a network.

In other implementations, all of the processing described throughout this disclosure may be performed on a remote server (e.g., monitoring application server 160). In these implementations, the monitoring system control panel (or sensors themselves) may send image/video data to the remote server over a network and the remote server may perform all of watering vegetation based on video analytics. For instance, the monitoring system control unit 110 sends all captured image/video data to the monitoring application server 160 and the monitoring application server 160 performs the processing of watering vegetation based on video analytics.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the interpretation of image/video data collected relatively recently (e.g., image/video data collected within the past three months) and the remote server may perform the detection of patterns in image/video data collected over a longer period of time (e.g., image/video data collected over the past several years). Alternatively, the monitoring system control panel may perform pre-processing of the image/video data, including collection and aggregation of the image/video data, and the remote server may perform the detailed analysis of detecting patterns within the image/video data. In the example shown in FIG. 2, the processing described throughout this disclosure may be mixed between the monitoring system control unit 110 and the monitoring application server 160.

Figure 3A:
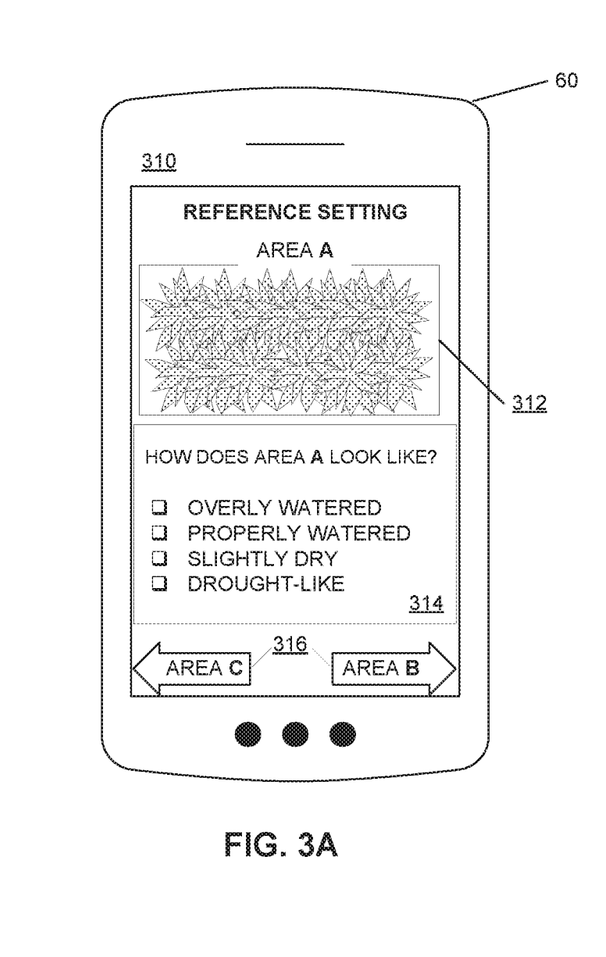
FIGS. 3A-3B are examples of user interfaces for an application.
Figure 3B:
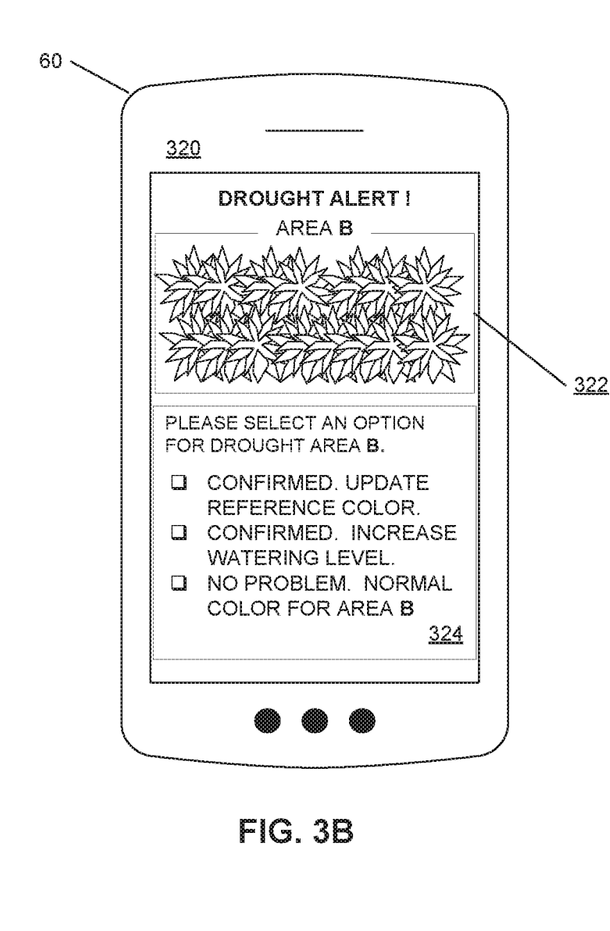

FIGS. 3A-3B are examples of user interfaces 310 and 320 of an application that includes a vegetation monitoring used by a user 50 of a property 10 (see FIG. 1). For instance, the interface 310 enables the user 50 to set up or train a monitoring server 30 for vegetation areas 80A, 80B, and 80C of the property 10, and the interface 320 enables the user 50 to receive an alert regarding a dry condition of the vegetation areas 80A, 80B, and 80C of the property 10. In some implementations, the user interface may enable the user 50 to determine vegetation areas of the property 10 through an interactive graphic application, for instance, that user can draw a boundary of the vegetation area. Although FIGS. 3A-3B illustrate the interfaces 310 and 320 being displayed on a mobile application running on a mobile phone 60, in other implementations, the interfaces 310 and 320 can also be displayed in other electronic formats such as a desktop application, a webpage, or other types of content distribution interfaces. In some instances, the mobile phone 60 corresponds to the user device 140, 150 described previously with respect to FIG. 2.

Referring to FIG. 3A, the interface 310 includes a reference setting page that displays a sample image 312 of a particular vegetation area A and a list of dry conditions 314 that the user can select to indicate a dry condition that corresponds to the vegetation area A shown in the sample image 312. For instance, while setting up the monitoring server 30, the user 50 may be prompted at a sample image 312 or multiple sample images of a predefined vegetation area A and then select a condition for the vegetation area shown in the sample image 312. The monitoring server 30 then receives a user selection of a dry condition that corresponds to the color of the vegetation area image 312. The dry conditions listed in the interface 310, for example, may include "OVERLY WATERED," "PROPERLY WATERED," "SLIGHTLY DRY," and "DROUGHT-LIKE." The user may perform this selection for other vegetation areas 316 with sample images of area B and area C. In some cases, the user 50 may also observe wilting leaves in the sample image 312 and select a corresponding dry condition. In response to receiving user input of a dry condition via the interface 310, the monitoring server 30 determines a reference color that corresponds to the dry condition that user indicated for the vegetation area A.

Referring to FIG. 3B, the interface 320 includes an alert warning page that displays a sample image 322 of a vegetation area B and a list of options 324 that the user can select to instruct the monitoring server 30 to perform with regards to the alert. For instance, the monitoring server 30 determines a potential drought in vegetation area B based on video analytics and sends a drought alert warning with a sample image 322 over network to the mobile phone 60. The user may select one of the example options 324 such as "CONFIRMED. UPDATE REFERENCE COLOR," "CONFIRMED. INCREASE WATERING LEVEL," and "NO PROBLEM. NORMAL COLOR FOR AREA B." For example, the user 50 may confirm the drought in area B as alerted by the interface 320 and instruct the monitoring server 30 to update a reference color of a dry condition for area B. In addition, the monitoring server 30, in response to the user confirmation, may trigger a watering device 90B to increase watering level for area B. In some cases, especially for early training periods, the user 50 may receive a false alarm about potential drought in a vegetation area. In this case, the user 50 may select "NO PROBLEM," to instruct the monitoring server 30 to update a reference color to disassociate with the alerted dry condition.

Figure 4:
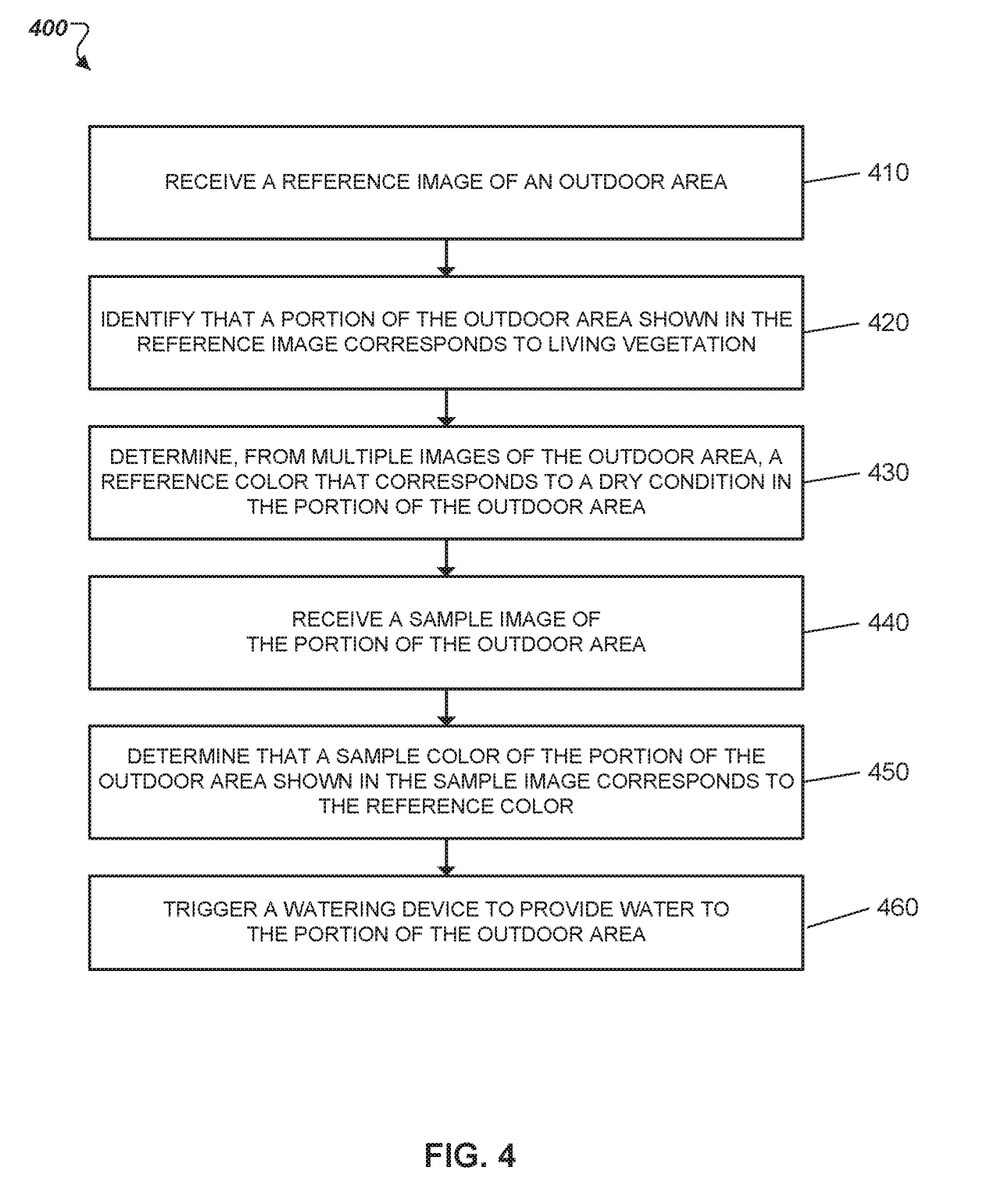
FIG. 4 is a flow chart of an example process for triggering a watering device based on image analytics.

FIG. 4 illustrates an example process 400 for watering based on video analytics. The system 200 receives a reference image of an outdoor area of a property captured by a monitoring system that monitors the property (410). For example, the system 200 receives, over a network, an image of an outdoor area captured by a camera 130 fixed at the property. In some cases, the system 200 may receive multiple images from one or more cameras 130. The system 200 may receive all images captured by the monitoring system, regardless of whether the monitoring system is in an armed state or an unarmed state.

The system 200 identifies that a portion of the outdoor area shown in the reference image corresponds to living vegetation (420). For instance, the system 200 identifies the vegetation areas based on video analytics with the received reference image that may show various areas of the property such as a driveway, front/back yards, vegetation areas (e.g., lawns), and ground areas around the property.

The system 200 may analyze colors of the outdoor images, change of the colors, a shape of an object in the outdoor areas, or movement of the object to identify the vegetation areas from the reference image of the outdoor areas. The system 200 may also analyze the outdoor images injunction with other data available to the system 200, such as location data of the property 10, weather data, precipitation data, time of a day, and season. In some examples, the system 200 identifies the vegetation area based on a user input. In this case, the user may utilize the user device 140, 150 to indicate the vegetation area in the reference image.

Figure 5:
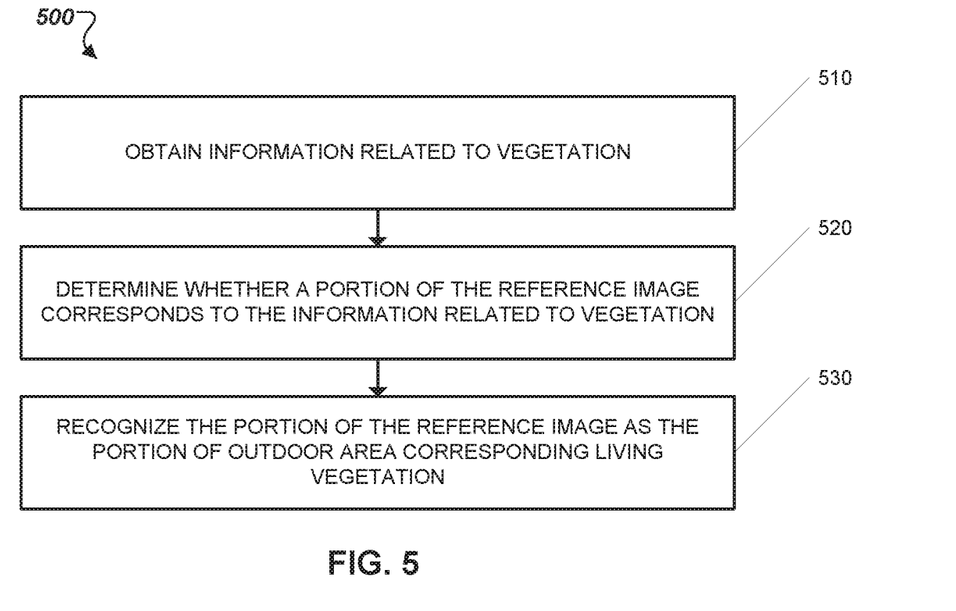
FIG. 5 is a flow chart of an example process for identifying a vegetation area from an image.

FIG. 5 illustrates an example process 500 for identifying that the portion of the outdoor area shown in the reference image corresponds to the living vegetation. The process 500 may correspond to the step 420 in FIG. 4. In some implementations, the system 200 may obtain information related to vegetation (510). For example, the system 200 may obtain the information from a user (e.g., a homeowner, a gardener). The user may specify an area in the reference image as a vegetation area to track. For example, the user views the reference image through a mobile device, and indicates a portion or portions of the reference image as vegetation area(s) by drawing an outline or circle around the portion(s) on a display of the mobile device. Then the system 200 recognizes the indicated portion(s) as vegetation area(s) to track. In some cases, the system 200 may repeat the process with multiple images to train the system to recognize other types of vegetation based on user input for the multiple images.

In other examples, the system 200 may obtain the information from other sources such as the internet to identify that the portion of the outdoor area shown in the reference image corresponds to the living vegetation. For example, the information related to vegetation may include types of vegetation, colors of vegetation, shapes of vegetation, movement information of vegetation, or any combination thereof. The types of vegetation may include various types of trees, flowers, and lawns, and the colors of vegetation may include a range of colors corresponding to different times (e.g., seasons). The movement information of vegetation includes a movement speed of vegetation due to movement of the sun or wind.

The system 200 may determine whether a portion of the reference image corresponds to the information related to vegetation (520). For example, if a color of a portion of the reference image matches one of the colors of vegetation included in the information, the system 200 determines that the portion of the reference image corresponds to the living vegetation to track. Based on a determination that the portion of the reference image corresponds to the information related to vegetation, the system 200 may recognize the portion of the reference image as the portion of the outdoor area corresponding to the living vegetation (530). In some cases, the system 200 may repeat this process with multiple images to train the system to recognize other types of vegetation based on the multiple images.

Referring to FIG. 4, the system 200 determines, from multiple images of the outdoor area, a reference color that corresponds to a dry condition in the portion of the outdoor area (430). For instance, the system 200 analyzes the aggregated image data to determine a reference color of the vegetation area. In a simple example, a reference color may be an average color of the multiple images captured from a vegetation area. In some cases, the system 200 may determine an average color of portions corresponding to the living vegetation shown in the multiple images of the outdoor area over a period of time. For example, the system 200 may determine a reference color corresponding to an average color for each season (i.e., spring, summer, fall, and winter), each quarter (e.g., January to March, April to June, July to September, and October to December), each month, each week, every two weeks, etc.

In some implementations, the system 200 may obtain the multiple images over a period of time as described above. The reference color may include a certain range of colors (e.g., a range of digital color Hex values), which is expected for the vegetation area for a certain period of time. For instance, the system 200 determines that the current time is the fourth week of April, which corresponds to an expected color of weak green (Hex code #009900). Similarly, the system 200 may include a plurality of reference colors corresponding to a plurality of periods of time. In this case, for a proper comparison between the reference color and the sample color, the system 200 compares a sample color of the sample image taken at a time instant to a reference color corresponding to the time instant.

Alternatively or in addition, the system 200 may utilize input from a user to determine a dry condition corresponding to the reference color. For example, as previously described regarding FIG. 3A, the system 200 may transmit one or more images of the outdoor area to a user, and receive an input that specifies a dry condition corresponding to the one or more images of the outdoor area. Then the system 200 may determine that the reference color corresponds to the dry condition based on the input from the user. For example, the system 200 may determine a digital color from the reference image and associate the digital color to one of the four conditions "overly watered," "properly watered," "slightly dry," and "drought-like" according to a user selection.

In some examples, a determination of a reference color corresponding to a dry condition based on input from a user may override a determination of a reference color based on multiple images of the outdoor area. For instance, the system 200 may first determine that a reference color corresponds to the "slightly dry" condition based on analysis of multiple images of the outdoor area. However, if the user selects the "property watered" condition based on the image transmitted to the user, the system 200 determines that the reference color corresponds to the property watered condition.

In some cases, the system 200 may also utilize other various factors that can affect a color in an image such as time of a day, light condition, weather, and season. In this regard, the reference color may be associated with the various conditions. For example, a reference color for a vegetation area at 7 AM may be different than that at 12 PM. The system 200 then determines a dry condition corresponding to the reference color. For example, the monitoring server 30 uses knowledge of region, common vegetation, and index of other nearby property values. In some cases, the monitoring server 30 may utilize or assume previously determined vegetation color vs. dry condition to determine a dry condition corresponding to the current color of the vegetation areas. In some examples, the system 200 determines the dry condition corresponding to a reference color of the vegetation area based on a user input. In this case, the user may utilize the user device 140, 150 to indicate a dry condition for the vegetation area and the system 200 determines a digitized reference color corresponding to the dry condition that the user indicated.

The system 200 receives a sample image of the proportion of the outdoor area (440). For example, the system 200 may receive an image of the vegetation area viewed by the camera 130. The sample image may be substantially real-time image, e.g., captured less than a minute ago or thirty seconds ago from the time the image is being analyzed. The sample image may be periodically captured and sent to the system 200 based on a predetermined schedule. In some examples, the system 200 may receive multiple images from multiple cameras to monitor a large vegetation area.

The system 200 determines that a sample color of the portion of the outdoor area shown in the sample image corresponds to the reference color that corresponds to a dry condition in the portion of the outdoor area (450). For example, the system 200 may analyze the sample image to determine a sample color of the vegetation area shown in the sample image in a similar manner as described in the steps 420 and 430.

The system 200 may compare the sample color of the vegetation area with the reference color that is associated with a dry condition of the vegetation area. In some examples, the system 200 may have a predetermined threshold level of color difference between the sample color and the reference color to determine that a sample color of the portion of the outdoor area shown in the sample image corresponds to the reference color that corresponds to a dry condition in the portion of the outdoor area.

In response determining that a sample color of the portion of the outdoor area shown in the sample image corresponds to the reference color that corresponds to a dry condition in the portion of the outdoor area, the system triggers a watering device to provide water to the portion of the outdoor area (460). For instance, the system 200 may determine that the sample color of the sample image corresponds to a reference color that is associated to a drought-like condition for a particular vegetation area. The system 200, in response, controls a sprinkler system to activate a corresponding sprinkler head that can provide water to the determined drought-like vegetation area.

In some implementations, the system 200 may determine a moisture level of the portion of the outdoor area shown in the sample image based on the sample color. In some examples, alternatively or in addition, the system 200 may include a sensor to detect the moisture level of soil of the vegetation area. The system 200 may control, based on a determination that the moisture level is less than a threshold level, control the watering device (e.g., sprinkler system) to provide water to the portion of the outdoor area. The threshold level may be may be a certain digital color value (e.g., pale green #98FB98) corresponding to a dry condition of the vegetation area or a percentage of moisture with respect to a total volume of soil (e.g., 10o) corresponding to a dry condition of the vegetation area. The threshold level may include an upper threshold level at which the watering device should decrease an amount water to the vegetation area, and a lower threshold level at which the watering device should increase an amount of water to the vegetation area. The watering device may increase or decrease increase or decrease at least one of a frequency of watering or a duration for watering to control the amount of water.

In some examples, the system 200 may send a notification to a user based on a determination that the moisture level is less than the threshold level. For example, the system 200 may send the notification to the user with an image of the vegetation area. The user may confirm the dry state of the vegetation area based on the image, and permit the system 200 to trigger the watering device to provide water to the vegetation area. In some cases, the watering device may not support automatic control of the watering device, or may be set to a manual mode where the user manually adjusts an amount of water by changing the frequency of watering or a duration for watering.

In some examples, the system 200 may determine a watering schedule of the watering device based on the sample color corresponding to a moisture level of the portion of the outdoor area shown in the sample image. For example, the system 200 may control a sprinkler system to adjust a watering schedule of the sprinkler system to increase a frequency of watering or a duration for watering in response to a determination that the vegetation area includes moisture less than a lower threshold level. In another example, the system 200 may control a sprinkler system to decrease a frequency of watering or a duration for watering in response to a determination that the vegetation area includes moisture more than an upper threshold level. The system 200 may maintain a current watering schedule of the sprinkler system in response to a determination that the vegetation area includes moisture between the upper threshold level and the lower threshold level.

In some examples, the system 200 may also update a correlation data to aggregate a dry condition corresponding to a vegetation color based on determining that the sample color of the sample image corresponds to a reference color that is associated to a drought-like condition for a particular vegetation area. In some examples, the system 200 may detect a change of the watering schedule/status and notify a user (e.g., a homeowner). For example, property users (e.g., tenants) may turn off the sprinkler system or reduce watering amount to lower their water bills, which may result in a landscape damage. In this case, the system 200 may detect that occurrence and then either override control of the sprinkler system and/or notify the property owner.

Figure 6:
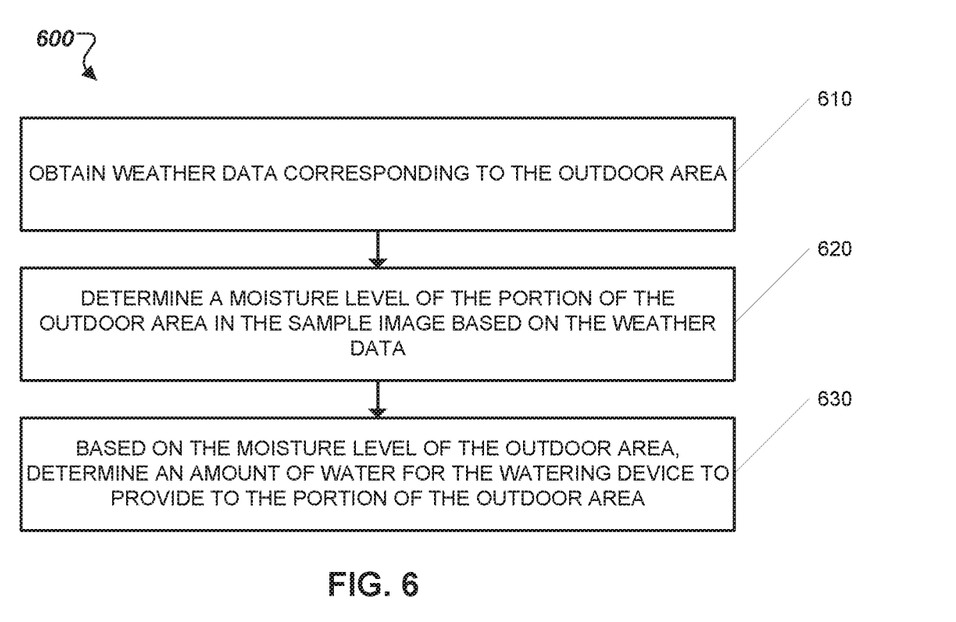
FIG. 6 is a flow chart of an example process for determining an amount of water to provide to vegetation based on weather data.

FIG. 6 illustrates an example process 600 for determining an amount of water to provide to vegetation based on weather data. In some implementations, the system 200 may utilize weather data to determine a moisture level of the vegetation area, to train the system to recognize a sample color corresponding to the weather data, or to determine an amount of water to provide to the vegetation area.

The system 200 may obtain weather data corresponding to the outdoor area (610). The weather data may include information about a current weather, a previous weather, and weather forecasts. For example, the system 200 may include a rain sensor configured to detect precipitation and may obtain weather data such as an amount of rain detected by the rain sensor. In some examples, alternatively or in addition, the system 200 may obtain weather data from a remote station such as weather forecast providers.

In some examples, the system 200 may train the system utilizing the weather data. For example, the system 200 may recognize that it rained yesterday based on weather data obtained from a rain sensor or a weather forecast provider. Then, the system 200 may compare a sample color of a first image captured yesterday or before the rain with a sample color of a second image captured today or after the rain. In this example, the sample color of the second image may correspond to, as a result of the rain yesterday, a proper moisture level and a healthy condition of the vegetation (e.g., greener color) compared to the sample color of the first image. Similarly, the system 200 may correlate an amount of precipitation to sample colors of vegetation areas shown in images based on comparison results between the sample colors before and after precipitation.

The system 200 may determine a moisture level of the portion of the outdoor area in the sample image based on the weather data (620). For example, the system 200 may obtain a soil moisture level from a moisture sensor installed at the outdoor area to determine the moisture level of the portion of the outdoor area in the image. In some cases, the system 200 may determine the moisture level of the portion of the outdoor area in the image based on recent precipitation (e.g., precipitation data for a few days, a week, or a month). Based on the moisture level of the portion of the outdoor area, the system 200 may determine an amount of water for the watering device to provide to the portion of the outdoor area (630). For example, if it rained for a week, the system 200 may determine to reduce an amount of water for the watering device to provide to the portion of the outdoor area for next couple of days. In other cases, the system 200 may obtain a weather trend of previous years and compare an amount of the recent precipitation with an amount of precipitation of the weather trend. In this case, the system 200 may determine to trigger the watering device if the amount of the recent precipitation is less than the amount of precipitation of the weather trend.

In some examples, the system 200 may restrict the watering device from providing water to the portion of the outdoor area based on the weather data. For example, if the system 200 detects rain starting to drop or receives weather forecasts expecting rain soon (e.g., in a few hours, in a day, or in a few days), the system 200 may determine not to trigger the watering device even if a sample color of an sample image of the vegetation area corresponds to a dry condition. In this way, the system 200 may avoid over-watering the vegetation area as well as reduce waste of water.

In some implementations, the system 200 may identify types of vegetation in vegetation areas of a property and determine a proper amount of water for each vegetation type based on the identified types of vegetation. For example, the vegetation type may include different kinds of trees, flowers, vegetable/fruit plants, or lawn grasses. The system 200 may utilize a database available to the system which includes example images of various types of vegetation to compare with sample images of vegetation areas of a property. The database may also include gardening information such as temperature ranges, watering amounts, and light amounts for the various types of vegetation. By utilizing this gardening information, the system 200 may determine a proper amount of water for the identified types of vegetation. Alternatively or additionally, the system 200 may receive a user input about the type of vegetation or a user confirmation about the identified type of vegetation. For example, the user might identify specific plants as hydrangeas, or butterfly bushes or catmint etc. This would potentially make the image analysis to determine the watering state more accurate. The system could use a reference image database to "guess" the type of vegetation and then have the user confirm, like "we think this is a *hydrangea*, click CONFIRM below or search for a different type of plant."

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired, and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A computer-implemented method comprising:
receiving, by at least one controller, a reference image of an outdoor area;
identifying, by the at least one controller, that a portion of the outdoor area shown in the reference image corresponds to living vegetation;
determining, by the at least one controller, from multiple images of the outdoor area, a reference color that corresponds to a dry condition in the portion of the outdoor area;
receiving, by the at least one controller, a sample image of the portion of the outdoor area;
determining, by the at least one controller, that a sample color of the portion of the outdoor area shown in the sample image corresponds to the reference color; and based on a determination by the at least one controller that the sample color of the portion of the outdoor area shown in the sample image corresponds to the reference color, transmitting, by the at least one controller, an instruction from the at least one controller to a watering device to provide water to the portion of the outdoor area.

2. The method of claim 1, wherein identifying that the portion of the outdoor area shown in the reference image corresponds to the living vegetation comprises:
obtaining information related to vegetation;
determining whether a portion of the reference image corresponds to the information related to vegetation; and
based on a determination that the portion of the reference image corresponds to the information related to vegetation, recognizing the portion of the reference image as the portion of the outdoor area corresponding to the living vegetation.

3. The method of claim 2, wherein obtaining the information related to vegetation comprises obtaining at least one of types of vegetation, colors of vegetation, shapes of vegetation, or movement information of vegetation.

4. The method of claim 2, wherein obtaining the information related to vegetation comprises obtaining user input that indicates areas corresponding to the living vegetation.

5. The method of claim 1, wherein determining, from multiple images of the outdoor area, the reference color comprises determining an average color of portions corresponding to the living vegetation shown in the multiple images of the outdoor area over a period of time.

6. The method of claim 1, further comprising:
transmitting one or more images of the outdoor area to a user;
receiving, from the user, an input that specifies the dry condition corresponding to the one or more images of the outdoor area; and
determining that the reference color corresponds to the dry condition based on the input from the user.

7. The method of claim 6, wherein determining that the reference color corresponds to the dry condition based on input from the user comprises overriding a determination of the reference color based on the multiple images of the outdoor area.

8. The method of claim 1, wherein determining, from the multiple images of the outdoor area, the reference color that corresponds to the dry condition in the portion of the outdoor area comprises:
obtaining the multiple images over a period of time;
determining that a current time corresponds to the period of time;
based on a determination that the current time corresponds to the period of time, determining an expected color of the living vegetation corresponding to the current time; and
determining the expected color as a reference color corresponding to the current time.

9. The method of claim 1, further comprising:
determining a moisture level of the portion of the outdoor area shown in the sample image based on the sample color; and
based on a determination that the moisture level is less than a threshold level, controlling the watering device to provide water to the portion of the outdoor area.

10. The method of claim 9, wherein controlling the watering device to provide water to the portion of the outdoor area comprises increasing or decreasing at least one of a frequency of watering or a duration for watering.

11. The method of claim 9, further comprising sending a notification to a user based on a determination that the moisture level is less than the threshold level.

12. The method of claim 1, further comprising determining a watering schedule of the watering device based on the sample color corresponding to a moisture level of the portion of the outdoor area shown in the sample image.

13. The method of claim 1, further comprising:
obtaining weather data corresponding to the outdoor area;
determining a moisture level of the portion of the outdoor area in the sample image based on the weather data; and
based on the moisture level of the portion of the outdoor area, determining an amount of water for the watering device to provide to the portion of the outdoor area.

14. The method of claim 13, wherein determining the amount of water comprises restricting the watering device from providing water to the portion of the outdoor area based on the weather data.

15. The method of claim 1, further comprising:
obtaining a soil moisture level from a soil moisture sensor installed at the outdoor area;
determining a moisture level of the portion of the outdoor area in the sample image based on the soil moisture level obtained from the soil moisture sensor; and
based on the moisture level of the portion of the outdoor area in the sample image, determining an amount of water for the watering device to provide to the portion of the outdoor area.

16. The method of claim 15, wherein determining the amount of water comprises restricting the watering device from providing water to the portion of the outdoor area based on the soil moisture level obtained from the soil moisture sensor.

17. A system for watering a vegetation area of a property, the system comprising:
one or more camera that are installed at the property and that are configured to capture an image of an area of the property;
a watering device that is installed at the property and that is configured to provide water to the vegetation area of the property; and
at least one controller configured to:
receive a reference image of an outdoor area,
identify that a portion of the outdoor area shown in the reference image corresponds to living vegetation,
determine, from multiple images of the outdoor area, a reference color that corresponds to a dry condition in the portion of the outdoor area,
receive a sample image of the portion of the outdoor area,
determine that a sample color of the portion of the outdoor area shown in the sample image corresponds to the reference color, and
based on determining that the sample color of the portion of the outdoor area shown in the sample image corresponds to the reference color, transmit an instruction to a watering device to provide water to the portion of the outdoor area.

18. The system of claim 17, wherein the at least one controller is further configured to:
obtain information related to vegetation;
determine whether a portion of the reference image corresponds to the information related to vegetation; and
based on that the portion of the reference image corresponds to the information related to vegetation, recognize the portion of the reference image as the portion of the outdoor area corresponding to the living vegetation.

19. At least one non-transitory computer-readable storage medium having stored thereon instructions which, when executed by at least one processor, cause performance of operations comprising:
receiving, by the at least one processor, a reference image of an outdoor area;
identifying, by the at least one processor, that a portion of the outdoor area shown in the reference image corresponds to living vegetation;
determining, by the at least one processor, from multiple images of the outdoor area, a reference color that corresponds to a dry condition in the portion of the outdoor area;
receiving, by the at least one processor, a sample image of the portion of the outdoor area;
determining, by the at least one processor, that a sample color of the portion of the outdoor area shown in the sample image corresponds to the reference color; and
based on a determination by the at least one processor that the sample color of the portion of the outdoor area shown in the sample image corresponds to the reference color, transmitting, by the at least one processor, an instruction from the at least one processor to a watering device to provide water to the portion of the outdoor area.

20. The at least one non-transitory computer-readable storage medium of claim 19, wherein the operations further comprise:
obtaining information related to vegetation;
determining whether a portion of the reference image corresponds to the information related to vegetation; and
based on a determination that the portion of the reference image corresponds to the information related to vegetation, recognizing the portion of the reference image as the portion of the outdoor area corresponding to the living vegetation.

\* \* \* \* \*

UNITED STATES PATENT AND TRADEMARK OFFICE
CERTIFICATE OF CORRECTION

| | |
|---|---|
| PATENT NO. | : 10,755,443 B1 |
| APPLICATION NO. | : 15/984771 |
| DATED | : August 25, 2020 |
| INVENTOR(S) | : Stephen Scott Trundle and Alison Jane Slavin |

Page 1 of 1

It is certified that error appears in the above-identified patent and that said Letters Patent is hereby corrected as shown below:

In the Claims

In Claim 18, Column 22, Line 66, after "on" insert -- determining --.

Signed and Sealed this
Twentieth Day of October, 2020

Andrei Iancu
*Director of the United States Patent and Trademark Office*